(12) United States Patent
Susnjara

(10) Patent No.: US 6,779,175 B2
(45) Date of Patent: Aug. 17, 2004

(54) METHOD AND SYSTEM FOR CONVERTING GRAPHIC DATABASES INTO CODED WORKPIECE PROCESSING PROGRAMS

(75) Inventor: Kenneth J. Susnjara, Birdseye, IN (US)

(73) Assignee: Thermwood Corporation, Dale, IN (US)

(*) Notice: Subject to any disclaimer, the term of this patent is extended or adjusted under 35 U.S.C. 154(b) by 379 days.

(21) Appl. No.: 09/862,295

(22) Filed: May 22, 2001

(65) Prior Publication Data

US 2004/0015932 A1 Jan. 22, 2004

(51) Int. Cl.[7] .............................................. G06F 9/45
(52) U.S. Cl. ..................................................... 717/136
(58) Field of Search ............................... 717/106–109, 717/136; 700/1.9

(56) References Cited

U.S. PATENT DOCUMENTS

| | | | | |
|---|---|---|---|---|
| 5,974,253 A | * | 10/1999 | Nahaboo et al. | 717/105 |
| 5,984,506 A | * | 11/1999 | Robbiani et al. | 700/162 |
| 6,049,343 A | * | 4/2000 | Abe et al. | 345/501 |
| 6,442,447 B1 | * | 8/2002 | Gross | 700/189 |

OTHER PUBLICATIONS

Brown. Computer Graphics for Large Scale Two and Three Dimensional Analysis of Complex Geometries. ACM. 1979, pp. 33–40.*
Rao et al. Integrated Force Measurement for On-line Cutting Geometry Inspection. IEEE. 1995. pp. 977–980.*
Jun et al. Control of an Automated Machining Workstation. IEEE. 1988. pp. 26–30.*

* cited by examiner

*Primary Examiner*—Wei Zhen
(74) *Attorney, Agent, or Firm*—Stevens, Davis, Miller & Mosher, LLP

(57) ABSTRACT

A method of converting a program, such as a graphic database, representing the geometry of a workpiece, into numeric control code in order to program a numeric machine control to operate a machine, such as a router. The machine control receives and processes the program according to a set of machine-specific attributes, including axis configuration and worktable size and layout. Operational attributes, such as feed rate and tool assignments, are specified. Optionally, multiple components or workpieces are nested into a cluster, and available off-fall sheets are matched to the cluster, so as to maximize the efficient use of material. Numeric code is then generated to permit the machine control to operate the machine.

24 Claims, 3 Drawing Sheets

METHOD AND SYSTEM FOR CONVERTING GRAPHIC DATABASES INTO CODED WORKPIECE PROCESSING PROGRAMS

The present invention relates to Computer Numerical Control (CNC) machines and more particularly to a method and system for converting graphic based computer programs from various sources into numeric control (NC) code in order to control the operation of a CNC based machine.

BACKGROUND OF THE INVENTION

In a typical CNC machine installation, workpiece processing programs are generated at a location separate from the machine, generally in an office environment. This type of programming is commonly referred to as "off-line" programming. While it is possible to generate programs at the machine, doing so can be economically prohibitive. Two factors contribute to such result. First, the CNC machine is an integrated production tool. In order to serve in a programming capacity, the CNC machine must be removed from production. Second, generating programs at the machine control requires the operator either to enter each axis movement as a line of NC code or to generate cut paths with a hand-held pendant as the machine executes each axis movement. Because they often consume a considerable number of hours per program, neither of these methods is more efficient than off-line methods.

A typical off-line process begins with the generation of a workpiece program using computer aided manufacturing (CAM) software. The program is then post-processed. Post-processing typically includes selection of tooling, assignment of various feed rates, nesting of cutting profiles into patterns that provide for maximum material utilization, and configuring the program into a specific machine format suitable for use by a CNC machine control. After the program has been completely processed off-line, it may be loaded into the control of a CNC machine center from magnetic storage media or sent directly to the machine through a local area network or a direct NC (DNC) link.

While off-line programming provides several significant advantages over the older, more conventional method of generating programs at the machine, it has certain shortcomings. For instance, the process is rather inflexible. Parameters such as tool selection and feed speeds, generated off-line, cannot be modified at the CNC control without great difficulty. When a program is conventionally post-processed, it is configured for a specific machine format and cannot be used on any other machine without going through the complete post-processing procedure again. It would be decidedly advantageous to have the ability to post process a program, to input and modify program parameters, and to configure the program automatically for the proper machine format at the machine control. This would allow a wide variety of off-line generated programs to be used on a diverse group of machines more efficiently.

Accordingly, the principal object of the present invention is to provide an improved method of converting a diverse group of off-line-generated computer programs into numeric control code in order to control a CNC machine system.

Another object of the invention is to provide method of programming a CNC machine control in such a way as to combine the benefits of off-line programming with the flexible selection of operational attributes at the machine control.

A further object of the invention is to provide a method of nesting at the machine control, workpieces and individual components of workpieces into clusters in order to maximize the use of available material.

A still further object of the invention is to provide a method of recording, tracking and matching off-fall sheets to nested clusters in order to optimize the use of available material.

A more specific object of the invention is to provide a system for carrying out at the central of a CNC machines the conversion of off-line generated computer programs into numeric control code in order to control such system, including means for nesting workpieces and components of workpieces into clusters and means for recording, tracking and matching off-fall sheet to nested clusters.

SUMMARY OF THE INVENTION

The present invention addresses the above-described problem by disclosing a method of converting off-line-generated component geometry programs into NC code in the CNC machine control. A program is presented to the machine control, where it is automatically configured for machine-specific attributes such as axis configuration and worktable size and layout. Control over various operational attributes such as tool selection and feed rates are assigned to the machine operator. The invention also provides for the utilization of off-fall (material left over from previous cutting operations) by recording and tracking off-fall as it is generated, automatically selecting suitably sized off-fall sheets, then nesting multiple workpieces or components of workpieces thereon for maximum material utilization. The use of off-fall, which frequently consists of sizable sheets of material, presents an economically beneficial and environmentally conscious alternative to wasting the material through disposal.

DESCRIPTION OF THE PREFERRED EMBODIMENT

Figure 1:
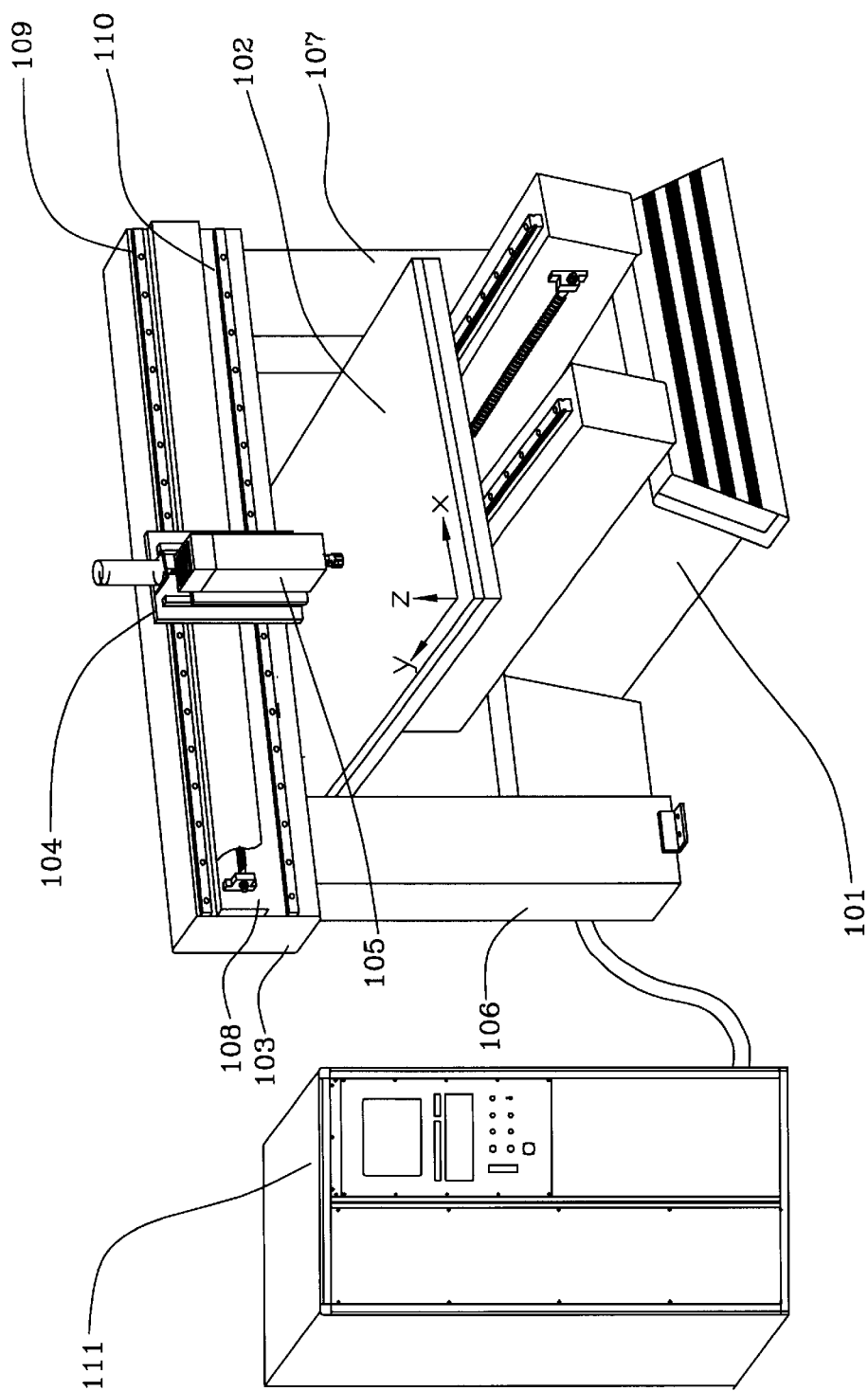
FIG. 1 is a perspective view of a computer numeric controlled (CNC) machining system embodying the present invention.

Referring to FIG. 1 of the drawings, there is illustrated a computer numeric controlled (CNC) machining system, which generally includes a base member 101, a worktable 102, a gantry 103, a toolhead support assembly 104 and a toolhead assembly 105 provided with a spindle in the lower end thereof. The gantry consists of a pair of leg members 106 and 107, rigidly secured at their lower ends to base member 101, and a transversely disposed section 108 supported on the leg sections and spanning above the worktable. The base member is formed of steel sections welded together to provide a rigid and stable foundation. Worktable 102 is mounted horizontally with the surface parallel to the plane formed by the x and y axes and is adapted to be displaced longitudinally relative to the base member or along a y axis. Worktable 102 may be of any number of sizes and layouts depending on the type of work to be performed using the machine. The front face of transverse section 108 is provided with a pair of vertically spaced, transversely disposed rails 109 and 110 on which toolhead support assembly 103 is mounted and displaceable transversely or along an x-axis. Toolhead assembly 104 is mounted on support assembly 105 and is adapted to be displaced vertically or along a z-axis by such assembly. Each of worktable 102, toolhead support assembly 104 and toolhead assembly 105 is displaceable along its respective axis by a feed screw arrangement driven by an AC servomotor. The operation of such servomotors is controlled by a programmable computer-numeric controller (CNC) 111 to provide for movement of a tool mounted on the toolhead assembly along a motion path to perform a work function such as routing, shaping, drilling and the like on a workpiece mounted on the worktable. Taken together, the axes of motion of worktable 102, toolhead support assembly 104 and toolhead assembly 105 can be said to form the axes configuration of the machine.

Those having ordinary skill in the art will recognize that several different arrangements of the elements of the machine as described are possible. As an example, instead of the worktable being displaceable and the gantry being stationary as described, the worktable can be stationary and the gantry may be displaceable along the y-axis to provide displacement between the gantry and the worktable. Because there are many possible variations on these machine-specific attributes, information about these attributes is necessary in order to generate the correct NC code for control of the machine.

Programming the machine, whether performed as part of a conventional method or in accordance with the present invention, makes use of two essential elements: A computer software system that generates cut-path geometry based on user-entered data, generally referred to as a Computer Aided Manufacturing (CAM) program, and a means of processing the cut-path data into usable NC code format. In perhaps its simplest form, an off-line-generated program may consist of nothing more than a data interchange file (DXF) from a computer aided drafting (CAD) program. Some of the more complex CAM software systems utilize a two-part parametric graphic software which allows for designing a specific type of end product, then converting the data into cut-path geometry for the individual components. However, regardless of the system being used, the cut-path geometry must be converted into usable NC code through post-processing. The post processing software program (post-processor) is usually a separate module from the CAM program. The post-processor, aside from converting the CAM program into NC code, also provides a means whereby the user may input operational attributes, such as feed speeds, tool selection, as well as machine-specific attributes, such as axis configuration and worktable size and layout.

The preferred embodiment of the present invention is carried out by means of software submodules embedded within the CNC machine control, which provide for the processing of off-line generated cut-path programs according to machine-specific attributes, the selection by the machine operator of operational attributes, and the generation of NC code, all with the CNC machine control. For example, program attributes such as tool assignments and feed speeds can be selected and entered by the operator based on conditions unique to a specific application. The software is also configured to process the program based on machine-specific attributes such as axis configuration and worktable size and layout.

A further important feature of the present invention is carried out by software that nests workpieces or components of workpieces onto appropriately sized sheets of material. A Workpiece may consist, for instance, of several individual components to be cut from the same material. Nesting is a process whereby the individual components within a workpiece program are assembled into a pattern that allows for the optimum number of components to be cut from the smallest possible amount of material. Algorithms for nesting are well known in the art. However, performing post-processing at the machine control further permits the use of off fall material that is available to a particular machine. Off-fall material may be material that has been left on the worktable from the preceding cutting cycle or that has been saved from previous cutting cycles and identified and stored for future use. Off-fall material is recorded and tracked in the software according to geometric shape and surface area, then matched to nested component clusters based on the amount of material required to execute the program. This method reduces the amount of wasted material by recapturing and using material that would otherwise be discarded, which reduces production costs and is more environmentally compatible.

Because post-processing is accomplished at the machine control, it is possible to nest substantially complementary components from multiple workpieces, or from multiple instances of the same workpiece, in order to improve nesting efficiency even further. The method disclosed herein permits multiple databases to be inputted, processed, and nested onto the same sheet of material. Such a feature is a valuable asset in terms of material conservation.

Figure 2:
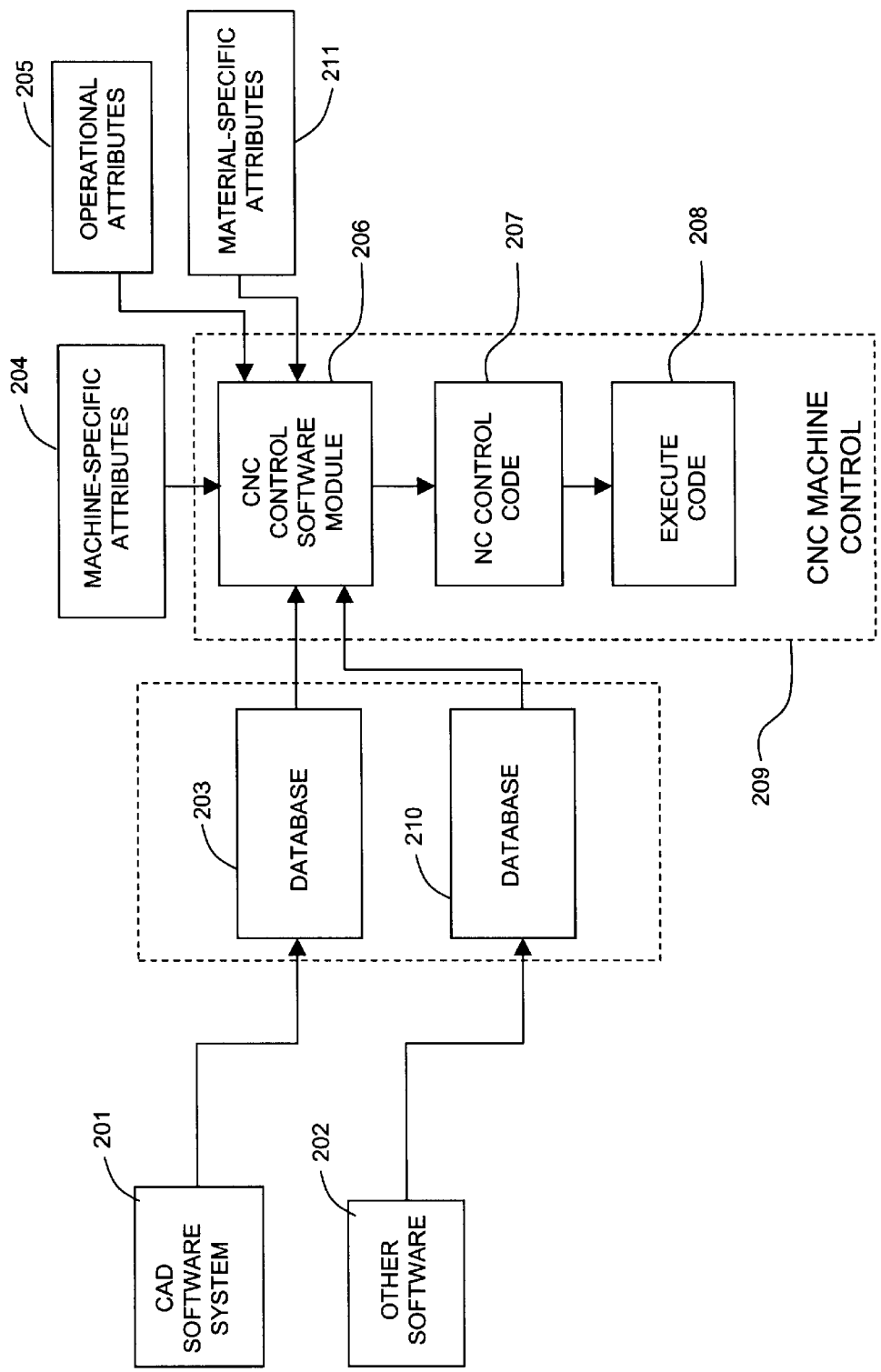
FIG. 2 is a diagram illustrating the interconnection and data flow between the various software modules comprising an NC code generating and processing scheme utilized in the embodiment shown in FIG. 1.

FIG. 2 is a conceptual diagram that demonstrates the interconnection and data flow between the various software modules that accomplish the NC code generating method described herein. Program data, originating from a basic CAD software system 201 or from other graphic-based software systems 202 are loaded directly into databases 203 and 210 respectively. While only two graphic databases are exemplified herein, it should be understood that numerous databases may be created, depending on the number of programs entered. The program data, as represented by the database, contain information about workpiece geometry. CNC control software module 206 is located within CNC machine control 209, which generally comprises a central processing unit, a memory, electronic storage, a display and one or more input devices, and is connected to and controls a CNC machine y executing code 208. Those skilled in the art will recognize that many different embodiments for CNC machine control 209 are possible. The data are loaded into CNC control software module 206 by any number of means for transferring data electronically, such as magnetic or optical data storage or local area network connection. The machine operator or programmer may then enter operational attributes 205, which may include tool assignments and feed speeds. Machine-specific attributes 204, such as worktable size and layout and axis configuration, are provided to CNC control software module 206. Program nesting and matching of appropriately sized new material or off-fall is performed based on recorded and tracked geometric shape and surface area data 211. NC control code 207 is generated based on the program data and on the attributes, which include machine-specific attributes 204, operational attributes 205 and material-specific attributes 211, such as geometric shape and surface area data for a piece of material. NC control code is then executed (208) as a workpiece processing program by the CNC machining system.

Figure 3:
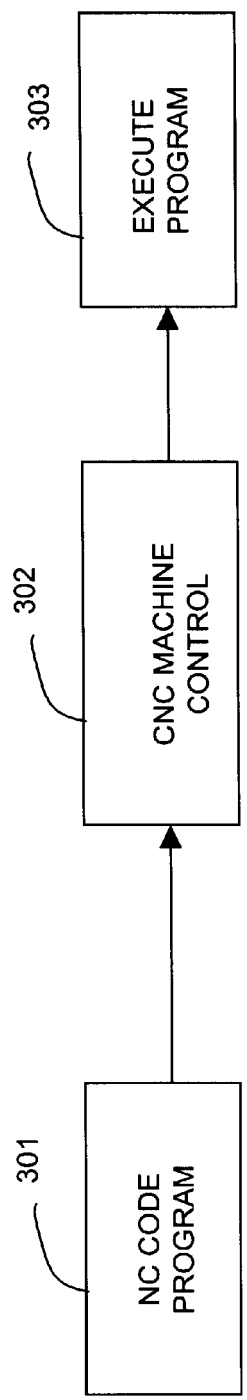
FIG. 3 is a flow diagram illustrating the conventional method of inputting NC code into a CNC machine control.

FIG. 3 exemplifies the flow of data in a conventional off-line programming scheme. An NC code program 301 originating from one of various sources is entered into the CNC machine control 302 where it is stored in machine memory to be retrieved at later time for program execution 303. The code must be post-processed with all parameter assignments before being loaded into a CNC control.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of converting a computer program representing a geometry of a workpiece into numeric control code to control a machine, comprising:

receiving at a machine control a program representing a geometry of a workpiece;

processing the program according to at least one machine-specific attribute;

selecting at least one operational attribute; and generating numeric control code from the processed program according to the selected operational attribute.

2. The method of claim 1 wherein the program is a graphic database.

3. The method of claim 1 wherein the machine-specific attribute comprises the axis configuration of the machine.

4. The method of claim 1 wherein the machine-specific attributes comprise worktable size and layout.

5. The method of claim 1 wherein the selected operational attributes comprise at least one tool assignment.

6. The method of claim 1 wherein the selected operational attribute comprises a feed speed.

7. A method of converting a computer program representing a cut-path geometry of a workpiece into numeric control code to control a machine, comprising:

receiving at a machine control a program representing a cut-path geometry of a workpiece;

processing the program according to at least one machine-specific attribute;

selecting at least one operational attribute according to desired operating conditions;

selecting at least one appropriately sized sheet of material; and generating numeric control code from the processed program, according to the selected operational attribute and selected sheet of material.

8. The method of claim 7, wherein the workpiece comprises a plurality of individual components.

9. The method of claim 8 wherein the step of selecting at least one appropriately sized sheet of material further comprises nesting the plurality of individual components into a cluster.

10. The method of claim 9 wherein the step of selecting at least one appropriately sized sheet of material further comprises: recording geometric shape and surface area for each of a plurality of off-all sheets; tracking the plurality of off-fall sheets; and matching one or more appropriately sized off-fall sheets to the cluster.

11. The method of claim 7 wherein the step of selecting at least one appropriately sized sheet of material further comprises nesting a plurality of workpieces into a cluster.

12. The method of claim 11 wherein the plurality of workpieces comprises multiple instances of a workpiece.

13. The method of claim 11 wherein the step of selecting at least one appropriately sized pieces of material further comprises: recording geometric shape and surface area for each of a plurality of off-fall sheets; tracking the plurality of off-fall sheets; and matching at least one appropriately sized off-fall sheet to the cluster.

14. A method of converting a computer program representing a cut-path geometry of a workpiece into numeric control code to control a machine, comprising;

receiving at a machine control a program representing a cut-path geometry of a workpiece;

processing the program according to at least one machine-specific attribute;

selecting at least one operational attribute according to desired operating conditions;

selecting at least one appropriately sized sheet of material; and generating numeric control code from the processed program, according to the selected operational attribute and selected sheet of material, wherein the step of selecting at least one appropriately sized sheets of material further comprises: recording geometric shape and surface area for each of a plurality of off-fall sheets; tracking the plurality of said off-fall sheets; and matching one or more appropriately sized off-fall sheets to the cut-path geometry of the workpiece.

15. A method of converting a computer program representing a geometry of a workpiece into numeric control code to control a machine, comprising: receiving at a machine control a program representing a geometry of a workpiece; processing the program according to a plurality of attributes, including machine-specific attributes, user-selected attributes and material-specific attributes; and generating numeric control code from the processed program and attributes.

16. A system for converting a program representing a geometry of a workpiece: means for receiving a program representing a geometry of a workpiece; means for processing the program according to at least one machine-specific characteristic; means for selecting at least one operational attribute according to desired operating conditions; and means for generating numeric control code from the processed program and selected operational attributes.

17. The system of claim 16 wherein the geometry is a cut-path geometry.

18. The system of claim 17, including: means for recording geometric shape and surface area for a plurality of off-fall sheets; and means for tracking the plurality of off-fall sheets.

19. The system of claim 17 wherein the workpiece includes a plurality of individual components.

20. The system of claim 19 including means for nesting the plurality of individual components into a cluster.

21. The system of claim 20 including: means for recording geometric shape and surface area for a plurality of off-fall sheets; means for tracking the plurality of off-fall sheets; and means for matching at least one appropriately sized off-fall sheets to the nested cluster.

22. The system of claim 17 including means for nesting a plurality of workpieces into a cluster.

23. The system of claim 22 wherein the plurality of workpieces comprises multiple instances of the workpiece.

24. A system for converting a program representing a cut-path geometry of a workpiece comprising:

means for receiving a program representing a geometry of a workpiece;

means for processing the program according to at least one machine-specific characteristic;

means for selecting at least one operational attribute according to desired operating conditions;

means for generating numeric control code from the processed program and selected operational attributes means for nesting a plurality of workpieces into a cluster, and means for recording geometric shape and surface area for each of a plurality of off-fall sheets; means for tracking the plurality of off-fall sheets; and means for matching one or more appropriately sized off-fall sheets to a nested cluster.

* * * * *